United States Patent [19]
Rote

[11] 4,394,714
[45] Jul. 19, 1983

[54] STEP LIGHTING SYSTEM

[76] Inventor: James Rote, 9523 Bullion Way, Orangevale, Calif. 95662

[21] Appl. No.: 241,046

[22] Filed: Mar. 6, 1981

[51] Int. Cl.³ .............................. F21V 7/04; F21S 1/14
[52] U.S. Cl. ........................................ 362/32; 362/146
[58] Field of Search .................. 362/146, 32, 145, 153

[56] References Cited

U.S. PATENT DOCUMENTS 4,143,411   3/1979   Roberts ............................ 362/146 X

FOREIGN PATENT DOCUMENTS 2437580   11/1975   Fed. Rep. of Germany ........ 362/32

OTHER PUBLICATIONS

*Fiber Optics*, International Rectifier Company, 1973.

Primary Examiner—Charles T. Jordan
Assistant Examiner—Ted L. Parr
Attorney, Agent, or Firm—Mark C. Jacobs

[57] ABSTRACT

A lighting system for stair treads, risers and the interface of one with the other which can extend the full width of the step is disclosed. The system which employs fiber optics to give the needed safety information, is intended primarily for theatres, moviehouses, auditoriums and other darkened areas. The system can also be equally well employed in banisters and hand rails for both interior and exterior use.

12 Claims, 9 Drawing Figures

U.S. Patent   Jul. 19, 1983   Sheet 1 of 2   4,394,714
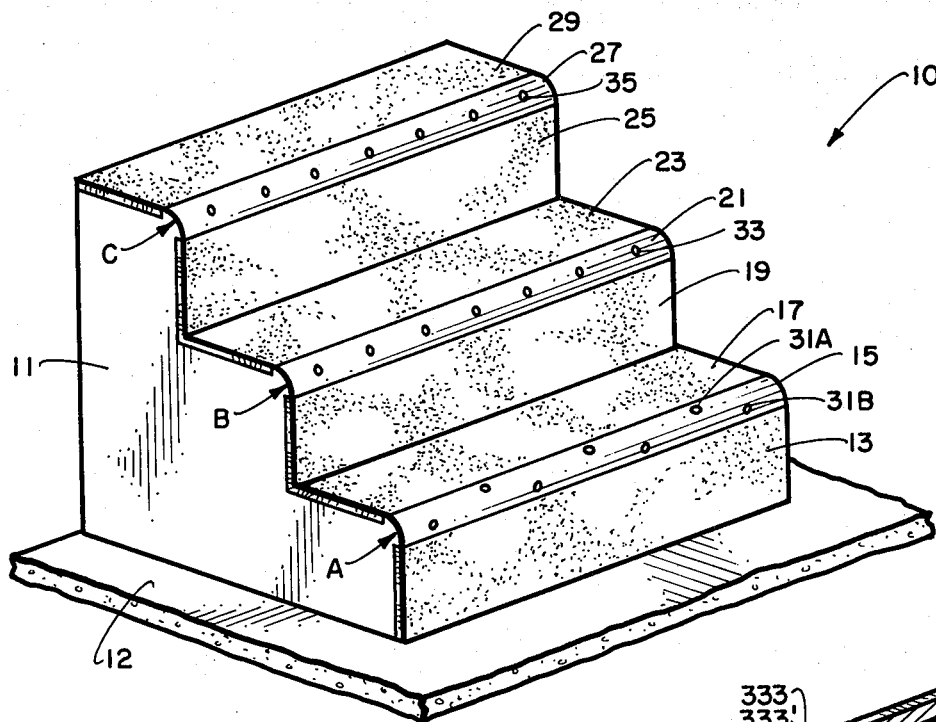
Fig. 1.
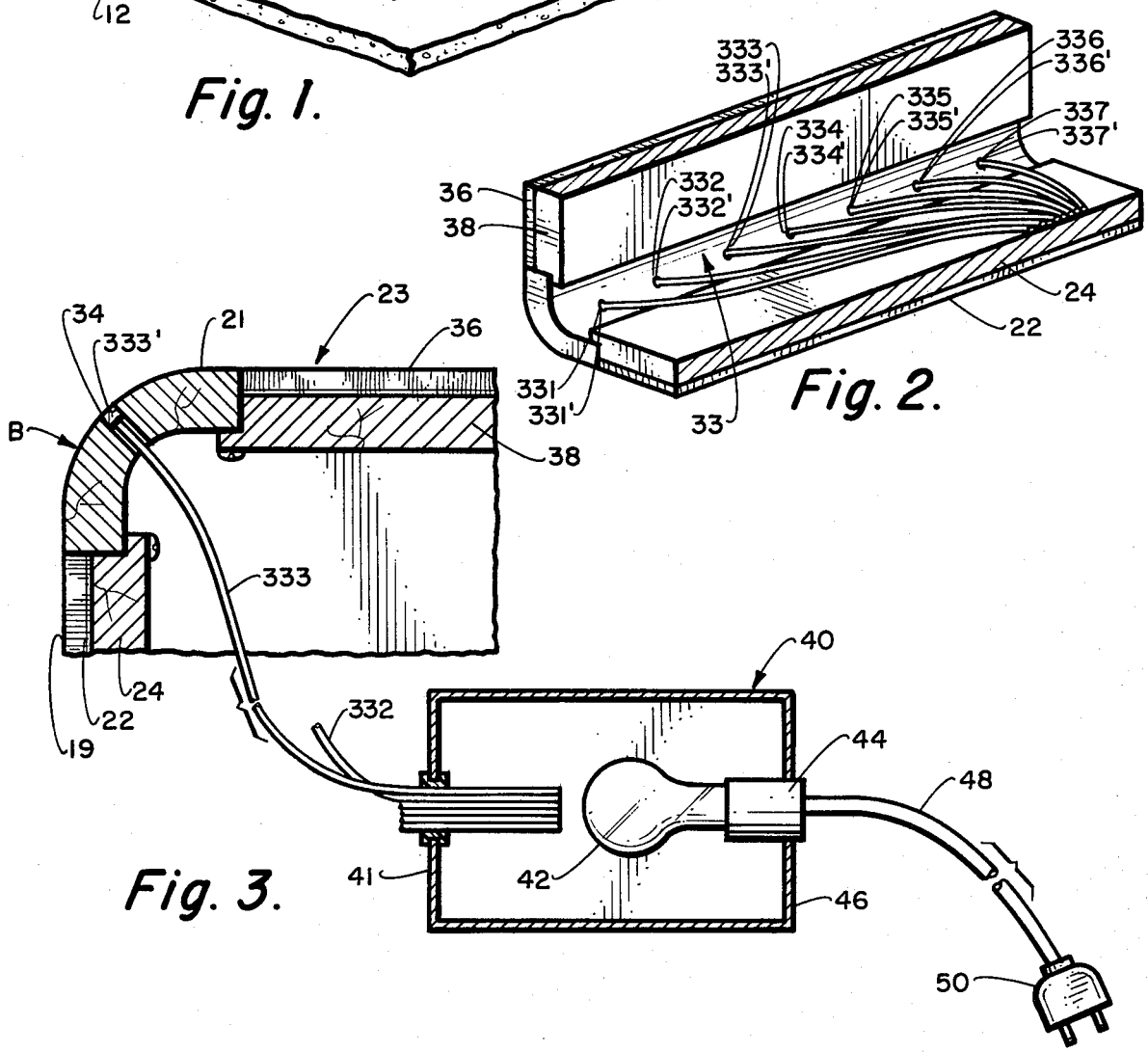
Fig. 2.
Fig. 3.

STEP LIGHTING SYSTEM

BACKGROUND OF THE INVENTION

Much time and attention has been focused this last decade on the construction of new theatres and auditoriums, all of which employ the latest building techniques both in the building itself and for the stage and backstage areas. Mention can be made of the Uris Theatre in New York City, the Davies Hall, the new home of the San Francisco Symphony, and the Convention Centre in Sacramento, just to name a few. One of the few areas that has not been improved is the safety lighting for the steps found in the various theatres and auditoriums. Some theatres employ a low wattage bulb fixture at the side of a seat every few rows. This concept is at least thirty years old. Others employ a recess in the riser of a step with a small bulb in a fixture with a metal slotted grate with downwardly angles louversto light a step. Such fixtures are employed every six or seven rows, more or less. Such fixtures suffer several disadvantages. Firstly, they light small areas only. Secondly, they don't light every step, and thirdly, the grates or louvers get warm to the touch from the heat generated. In addition, elderly persons frequently trip on them, and ladies wearing dresses can either snag their stockings or perhaps "toast" their ankles on them as they descrend or ascend slow moving stair ways or row inclines of several steps.

Thus, there is a need for a new, safe, low cost safety lighting system for theatres and auditoriums.

SUMMARY OF THE INVENTION

The lighting system of the present invention overcomes all of the shortcomings of conventional step lighting for theatres and auditoriums.

Thus, one object of this invention is to provide a safe, low cost stair lighting system, primarily for theatres and auditoriums that is energy efficient.

A second object is to provide a light system capable of lighting the entire width of a step.

Another object is to provide a light system using a remotely placed bulb which can be easily accessed for changing.

Still another object is to provide a new fiber optic light system for stair treads and risers.

Yet another object is to provide a lighting system also deployable in bannisters of darkened auditoriums, and other low lighted buildings.

Still another object is to provide a safe lighting system that can be employed in carpeted areas without fear of fire, based on the use of fiber optics.

A yet further object is to provide a system as will be described which uses fiber optic rods disposed within the stair riser or tread and which rods pipe light from a central source thereof.

These and other objects of the invention will in part be obvious and will in part appear hereinafter.

The invention accordingly comprises the steps and the relation and order of one or more of such steps with respect to the others, and the product possessing the features, properties and the relation of elements which are exemplified in the following detailed disclosure, and the scope of the application which will be indicated in the claims.

For a fuller understanding of the nature and objects of the invention, reference should be had to the following detailed description taken in connection with the accompanying drawings.

BRIEF DESCRIPTION OF THE DRAWINGS

FIG. 1 is a front perspective view of lighted steps according to this invention.

FIG. 2 is a rear perspective view of step B thereof.

FIG. 3 is an enlarged side view of the step B of FIG. 2 wherein a remote light source is employed.

DESCRIPTION OF THE PREFERRED EMBODIMENT

Figure 4:
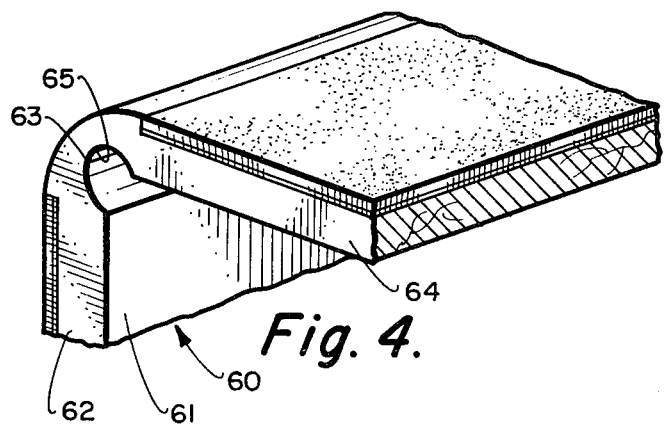
FIG. 4 is a perspective view of a preferred toe moulding for use in the instant invention's lighting system.

FIG. 1 depicts a typical stairway or stair section of three steps as are often found in theatres and auditoriums wherein the interfaces of the tread and riser are lit up by a lighting system according to this invention.

Stair section 11 is seen to extend from the auditorium floor 12 up three rows for row A, B, and C. The step at row A is seen to include riser 13, moulding 15 and tread 17. Moulding 15 has two rows of lighting therein 31A for the tread and 31B for the riser. Step B includes riser 19, moulding 21 and tread 23. The moulding 21 that interconnects the tread and riser contains lighting row 33. Step C includes riser 25, moulding 27 and tread 29 with lighting row 35 being disposed within moulding 27. Each step A, B, and C is the same but for the disposition of the various lighting row. In step A, lighting row 31A faces generally upwardly while 31B faces generally forwardly, aligned with the riser 13. Lighting row 33 is pointed at about a 45° angle at the section of the vertical and horizontal portions of the step. In step C, the lighting row 35 is disposed within the vertical position of the moulding 27. Details on the inner workings of the lighting rows will be recited in detail below.

In FIG. 2, which is a rear perspective view of step B and its corresponding lighting row 33, the details of the lighting row 33 are to be seen.

Lighting row 33 is seen to consist of a plurality of glass fibers 331 through 337 each of which is disposed in its corresponding aperture 331' through 337'. All of the optical fibers are directed from their respective apertures parallel to one another across the rear width of the riser toward a light source not seen in this view. Designator 34 and 38 will be discussed infra.

Fiber optics is the technique of transmitting light through long, thin, flexible fibers of glass, plastic or other transparent materials—see McGraw Hill Dictionary of Scientific & Technical Terms TM 1978. For the flexible fibers, often called cables, I preferably employ acrylic rods of a diameter of between 20 and 30 mm, that are colorless. If desired, colored rods may also be employed. Such rods are available in the marketplace, both singly and in bundles.

FIG. 3 is a side view of step B of FIG. 1. Here the step is configured in a manner in which it could be constructed for use in a theatre or auditorium.

In this figure, step B is seen to comprise a riser 24 and a tread 38 each interconnected to moulding cap 21 on the rear side thereof. The connection can be by screws, nails or other suitable attachment means. While each of 24 and 38 are shown with a flange or lip that overrides a portion of the moulding 21, which flange constitutes a good moulding surface, such surface is not required. This "toe-nailing" or "screwing" as the term is known in the art, may be employed. Such butt edge junctions though operable, are not as secure as an overlap joint as illustrated. Moulding 21 can be any wood, plastic, or metal moulding capable of being drilled to receive fiber optic rod 333 for example. The aperture size slightly larger than its diameter of such glass rod is 333′. The designator 34 pertains to a glass bead formed at the front eye of rod 333 as will be explained in detail below.

The tread and riser may extend to the front surface of the cap by being of the same depth as the cap 21, or it can be alot thinner such as to allow space for the placement of carpet 22 and carpet 36. Thus the total riser is made up of riser section 24 overlayed with carpet 22, while tread 23 comprises tread section 38 overlaid with carpet 36.

The carpet can be attached to the cap, using conventional techniques such as tape, glue and the like, if desired to prevent the edge joint with the cap from becoming ragged.

Glass fibre 333 is seen to terminate in a bead 34 at the top thereof. Bead 34 at the end of rod 333 is of larger cross-section and thus acts to secure the cable within its aperture 333′. Said bead is formed as by heating the rod in place as will be explained in more detail below. Bead 34 acts as a terminus for light transmitted along the fibre.

Glass rod (fibre) 333 is accumulated with other rods such as 332 from other locations along the moulding 21 and is disposed through multi-perforated wall 41 of housing 40. Here the collection of individual fibers are aligned in parallel fashion, resembling spaghetti in a box, spaced from light source 42 also disposed therein. Designator 44 pertains to a candelabra light socket intended to carry any, e.g. 12 volt or 110 volt incandescent bulb 42, said socket being mounted on wall 46 of said housing 40. Typically a low wattage from 7 to 25 watts may be employed for the bulb if a 110 volt bulb is utilized. The lighting system can be altered to meet the needs of a given application. Line cord 48 is connected to said socket 44 and to AC plug 50 for powering said light bulb 42.

Housing 40 may be disposed in any easily assembled location, such as behind a seat or tucked between the legs of a seat, or even further away at some central location. The distance between the location of the light source and the step does not effect the intensity of the channeled light.

While a corner moulding such as that shown in FIG. 4 can be employed with satisfactory results, after the proper bores have been made, I prefer to employ the moulding of this invention 60 which includes a rear surface 61 having a vertical portion 62, a horizontal portion 64 interconnected by an arcuate portion 63. Aperture 65 as seen in the 4th figure is the opening of a bore, a balance of which is not seen due to the angularity of the view. The toe moulding of this invention is superior, in that the arc section creates a space in which the individual fibers can flex to prevent kinking or pinching that can occur within a toe moulding.

It is seen that the arcuate portion 65 extends the full width of the rear side 61 of said moulding. Thus each light cable (fibre) can have adequate flex room viz a viz its adjacent cables.

The toe moulding of this invention can be formed of metal, wood, or plastic. It can be a solid or hollow structure. If solid, through bores are necessary for operability as previosly described. While if hollow, only aligned apertures on the front and rear walls need be formed therein.

I can also form moulding 60 of hard rubber or extruded plastic. No matter the form, hollow or solid, the moulding can be produced in various colors. One version that has proven extremely beneficial, and has been well received is an off-white extruded plastic that is solid in format. Typically I have employed rubber, but polyurethane and other dimension-stable plastics may be employed equally as well. This material is readily visible in full light, such that pedestrians can discern each step, due to the contact with carpet, and is easy to work with for insertion of the light pipes or light cables, as they have been referred to previously.

Figure 7:
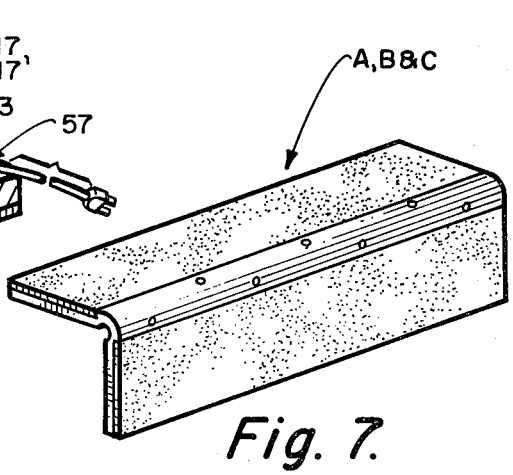
FIG. 7 is a perspective view of a preferred toe moulding.

As can be seen in FIG. 7, the preferred toe moulding employable in this invention can be used as a support for fibre optic cables in any of the three layouts shown in FIG. 1. Thus the letters A,B, and C of FIG. 1 are keyed to A, B, and C of FIG. 7.

Figure 5:
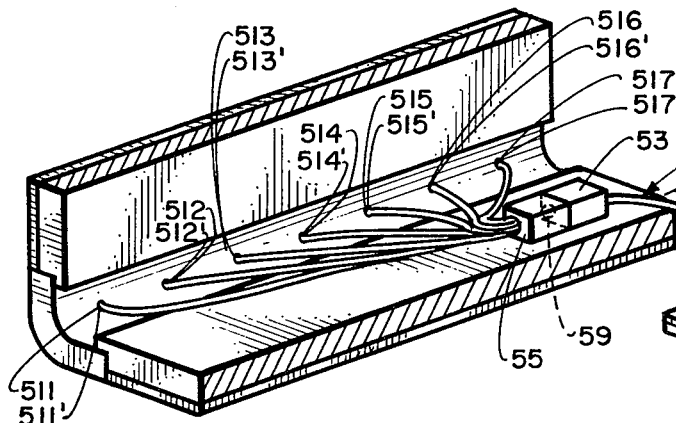
FIG. 5 is a rear perspective view similar to that of FIG. 2 but employing a locally disposed light source.

FIG. 5 is a rear perspective view of a modified version of the FIG. 2 embodiment. The cables are positioned for viewing in the same location, at the interface of the tread and the riser. Said cables being designated 511-517 respectively and the apertures through which they are inserted being 511′ through 517′ such as to correspond with the respective cables. Whereas in the FIGS. 2 & 3 format, the power-light source was located from the cables, such as in a box behind a chair, here the light source is local, i.e. mounted right on the rear of the moulding or optionally on the inside of the riser or tread. Obviously this last presupposes something other than a precast concrete riser or tread. Such mounting would employ conventional screws, bolts, tape, adhesive pads or the like to adhere light source 53 and light grid 55, the perforated fibre holder, to the instep of the step, out of view. Live cord 57 connects to any DC/AC power source. For such mountings, wherein space may be at a premium, the use of light emitting diodes or peanut bulbs 59 are suggested.

The details of grid 55 and light source 53 need not be recited as they are functionally part of the structure described in FIG. 3.

As has been recited previously, the stair lighting system of this invention can also be employed on the banister by employing a light panel moulding step 85 to cover over the slotted section 83 of hand rail 81. Slotted section 83 is intended primarily for finger tip disposition by stair climbers, but is not in fact needed for such purpose. Hence, its availability to receive a light panel 85, having cables 87 mounted therein. Light panel 85 may be flat or have small flanges therein,—not seen here,—which are within the skill of the art to mount said panel over the slotted portion 83 of hand rail 81. A plastic, metal, or wood member may be used for light panel 85. It can be gluded or screwed into place as may be desired. The balance of the installation of the light system of this invention is similar to that which has been described previously. However, due to the fact that the hands of people may be contacting the tips of the light cables, i.e. head 34, it may be advantageous to apply some glue to hold each glass fibre's terminal portion to its respective aperture.

Bead 34 is formed at the tip of the fibre glass rod by applying a flat head source such as a tip of a soldering gun to the cut length of fibre. The bead will form, as the operator slightly applies a flat pressure across the diameter of the cut fibre. Care should be exercised such that the bead formed is substantially equal to the diameter of the respective aperture, such as to frictionally engage the tip of the glass fibre into the end of its respective aperture.

Figure 9:
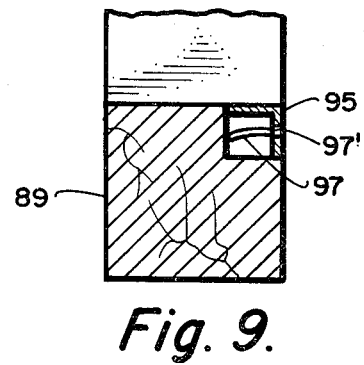
FIG. 9 is an elevational view taken on the line 9—9 of FIG. 8.
Figure 6:
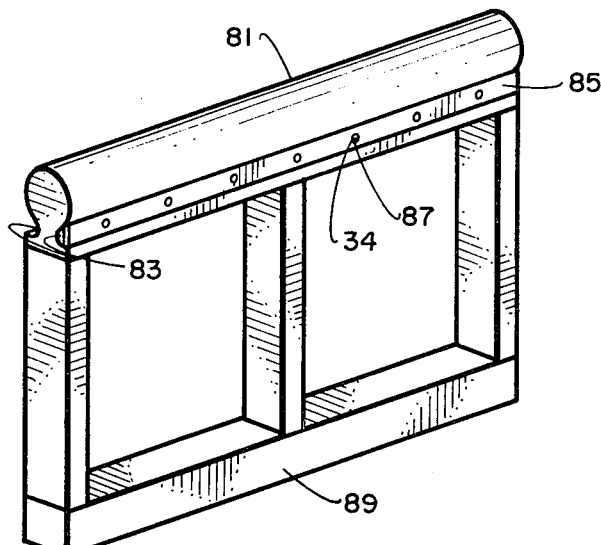
FIG. 6 is a perspective view of a bannister modified to incorporate the lighting system of this invention.
Figure 8:
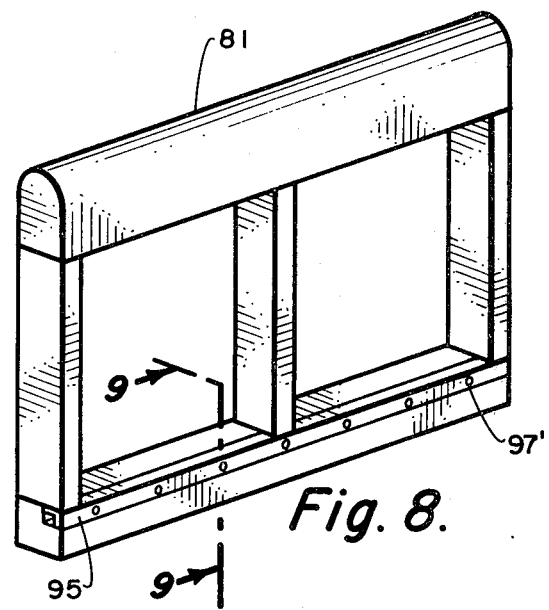
FIG. 8 is a perspective view of a bannister similar to FIG. 6.

Another type of light panel that can be employed, in addition to the toe moulding, and flat strip 85, is that employed in the embodiment of FIGS. 8 and 9. Here the hand rail has no recessed area which can be covered over by the light panel. The alternative therefore, is to match the main support 89 and employ a generally L-shaped panel 95 having apertures designated 97' therein to receive light cables 97. Panel 95 is obviously hollow, to permit disposition of the various light cables thereunder. Reference should be made to the sectional diagram FIG. 9 which shows such an installation. Though not shown, upwardly visible light cables are also contemplated for the installation of FIG. 9.

It is seen that there has been disclosed a plurality of embodiments of a novel, easily maintained, readily visible without being intrusive, stair lighting system. The system which can be employed in theatres, schools, auditoriums and the like can also be used in homes, and nursing homes to increase safety on the walking of stairs.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A lighting system for stairs comprising:
    (a) A light panel adapted for disposition in or proximate one or more steps, said panel comprising an elongated section having a plurality of fibre optic rod receiving apertures therein along the length of said panel,
    (b) a plurality of fibre optic cables, corresponding to the number of apertures with each of said apertures having an end of a cable therein,
    (c) a light source, comprising a source of light disposal within a housing connected to a power source,
    (d) a light grid, comprising areas adapted to receive all of said cables other ends and to dispose same toward said light source said light panel being disposed in the nose of the step to light the nose thereof, or within the balustrade to light the balustrade.

2. The device of claim 1 wherein the panel is a toe moulding at the interface of the tread and riser of the steps.

3. The device of claim 1 wherein the light panel is disposed within the banister of a balustrade.

4. The device of claim 3 wherein the light panel is disposed along the main support of said stairs.

5. The device of claim 2 wherein said light source is disposed on the underside of said moulding.

6. The device of claim 2 wherein said light source is disposed at a location remote from said moulding.

7. The device of claim 1 further including a bead formed on the end of and from each fibre optic cable part emplacement.

8. A lighted stair system comprising,
    (a) a toe moulding having a front and rear and having a plurality of horizontally aligned bores therethrough from front to rear,
    (b) a plurality of fibre optic cables, the exact number corresponding to the number of aligned bores, one of said cables being inserted in each of said bores, such that one end of the cable terminates at the front of said moulding and the balance of cable depends rearwardly,
    (c) a lighted source comprising a source of light connected to a power supply,
    (d) a light grid comprising means adapted to receive all of the second ends of said cables and to dispose same toward said light source.

9. In the device of claim 8 wherein the horizontally aligned bores are on the vertical surface of the toe moulding.

10. The device of claim 8 wherein the horizontally aligned bores are on the vertical surface of the toe moulding.

11. The device of claim 9 wherein the toe moulding comprises an injection molded plastic member.

12. The device of claim 11 wherein the moulding has flanges adapted to receive a floor covering thereon.

* * * * *